(12) United States Patent
Dobashi (10) Patent No.: US 9,554,025 B2
(45) Date of Patent: Jan. 24, 2017

(54) SOLID STATE IMAGE CAPTURING APPARATUS, CAMERA MODULE AND ELECTRONIC DEVICE INCLUDING ANTI-REFLECTION PLATE

(71) Applicant: Sony Corporation, Tokyo (JP)

(72) Inventor: Eiichiro Dobashi, Kumamoto (JP)

(73) Assignee: Sony Corporation, Tokyo (JP)

( * ) Notice: Subject to any disclaimer, the term of this patent is extended or adjusted under 35 U.S.C. 154(b) by 28 days.

(21) Appl. No.: 14/539,568

(22) Filed: Nov. 12, 2014

(65) Prior Publication Data

US 2015/0138424 A1    May 21, 2015

(30) Foreign Application Priority Data

Nov. 19, 2013  (JP) ................. 2013-239055

(51) Int. Cl.
| | | |
|---|---|---|
| *H04N 5/225* | (2006.01) | |
| *G02B 7/00* | (2006.01) | |
| *G02B 27/00* | (2006.01) | |
| *G02B 5/20* | (2006.01) | |

(52) U.S. Cl.
CPC ............ *H04N 5/2254* (2013.01); *G02B 7/006* (2013.01); *G02B 27/0018* (2013.01); *H04N 5/2257* (2013.01); *G02B 5/208* (2013.01)

(58) Field of Classification Search
CPC .................................................. H04N 5/2254
See application file for complete search history.

(56) References Cited

U.S. PATENT DOCUMENTS

| | | | | |
|---|---|---|---|---|
| 7,453,056 | B2 * | 11/2008 | Toyoda | ............... G02B 3/0075 250/208.1 |
| 8,279,336 | B2 * | 10/2012 | Tsuduki | ............ H01L 27/14618 348/374 |
| 2004/0120046 | A1 * | 6/2004 | Shirie | ................ G02B 27/0018 359/611 |
| 2009/0015948 | A1 * | 1/2009 | Wada | ....................... G02B 7/08 359/824 |
| 2012/0211852 | A1 * | 8/2012 | Iwafuchi | .......... H01L 27/14618 257/435 |

FOREIGN PATENT DOCUMENTS

JP    2012-186434 A    9/2012

* cited by examiner

*Primary Examiner* — Gary C Vieaux
(74) *Attorney, Agent, or Firm* — Sheridan Ross P.C.

(57) ABSTRACT

There is provided a solid state image capturing apparatus including an image capturing element for photoelectric converting an incident light; a light shielding filter for shielding a part of the incident light; and a metal plate partly having an opening for fixing the light shielding filter at a position for blocking the opening, an end of the opening of the metal plate being etched and antireflection treated. Also, a camera module and an electronic device are provided.

13 Claims, 13 Drawing Sheets

SOLID STATE IMAGE CAPTURING APPARATUS, CAMERA MODULE AND ELECTRONIC DEVICE INCLUDING ANTI-REFLECTION PLATE

CROSS REFERENCE TO RELATED APPLICATIONS

This application claims the benefit of Japanese Priority Patent Application JP 2013-239055 filed Nov. 19, 2013, the entire contents of which are incorporated herein by reference.

BACKGROUND

The present technology relates to a solid state image capturing apparatus, a camera module and an electronic device. More particularly, the present technology relates to a solid state image capturing apparatus, a camera module and an electronic device where an IRCF (an infrared cut filter) is fixed with a metal plate having an opening to decrease a distance to a solid state image capturing apparatus at the back of a lens (LB: lens back) thereby lowering a height of a housing.

SUMMARY

In recent years, a camera module is getting smaller and thinner. To provide the thin camera module, a region to which the IRCF is fixed is tried to be thin. Until now, the IRCF has been fixed by a molded product.

However, as the molded product has an opening for fixing the IRCF including faces to reflect an incident light, a ghost and a flare may be generated.

Japanese Patent Application Laid-open No. 2012-186434 proposes a technology that a light shielding region is printed on the surface of the IRCF, an end face area of the light shielding region generated at a boundary of an effective pixel range of an image capturing element is reduced to inhibit the incident light from reflecting and the ghost from generating.

However, in the technology in Japanese Patent Application Laid-open No. 2012-186434, a peripheral of the opening of the light shielding region printed on the surface of the IRCF cannot be thin, the end face for reflecting the incident light is provided thereby generating the ghost, and the opening cannot be small to inhibit the ghost.

In addition, as the opening cannot be small, the flare is generated by wire bonds and the IRCF cannot be small, the IRCF is costly.

Furthermore, when the light shielding region is printed on the IRCF, the IRCF itself remains great, whereby the cost cannot be decreased.

The present technology is provided in consideration of such a circumstance. In particular, by providing and fixing an opening on an etched and blackened metal plate, a lens back is reduced to lower a height, and a flare and a ghost are inhibited from generating, and by decreasing a size of the IRCF, a low cost is achieved.

According to an embodiment of the present technology, there is provided a solid state image capturing apparatus including an image capturing element for photoelectric converting an incident light, a light shielding filter for shielding a part of the incident light, and a metal plate partly having an opening for fixing the light shielding filter at a position for blocking the opening, ends of the opening of the metal plate being etched and antireflection treated.

The metal plate may have a half-etched step on which the light shielding filter is mounted at the end of the opening.

The metal plate may be press bent at the end of the opening.

The metal plate may be adhered to a structure including any of a substrate with in-built components, a packaged mold, a frame component, a lens unit and an actuator.

The metal plate may be bent partly.

The metal plate may have an adhesive reservoir step for applying an adhesive to fix the light shielding filter.

The step may be formed by half etching or diffusion bonding.

The metal plate may be fixed by adhering the light shielding filter to the end of the opening.

The light shielding filter may be an IRCF (infrared cut filter).

The antireflection may be by blackening.

The metal plate may be made of an iron-based, an aluminum-based and copper-based material.

The metal plate may have a plate thickness of about 0.02 mm to 0.05 mm.

The metal plate may have a hole, a concave or a granulated surface for improving adhesion properties to the structure corresponding to a convex for positioning disposed on the structure to be adhered.

The metal plate may have a vent.

The metal plate may have a light shielding wall at a peripheral.

According to an embodiment of the present technology, there is provided a camera module including an image capturing element for photoelectric converting an incident light, a light shielding filter for shielding a part of the incident light, and a metal plate partly having an opening for fixing the light shielding filter at a position for blocking the opening, an end of the opening of the metal plate being etched and antireflection treated.

According to an embodiment of the present technology, there is provided an electronic device including an image capturing element for photoelectric converting an incident light, a light shielding filter for shielding a part of the incident light, and a metal plate partly having an opening for fixing the light shielding filter at a position for blocking the opening, an end of the opening of the metal plate being etched and antireflection treated.

According to the embodiment of the present technology, the incident light is photoelectric converted by the image capturing element, the incident light is partly shielded by the light shielding filter, the light shielding filter is fixed at a position for blocking the opening, and the end of the opening of the metal plate is etched and antireflection treated.

According to first and second embodiments of the present technology, by fixing the light shielding filter (IRCF) with the metal plate being thin but having a predetermined strength, the flare and the ghost are reduced by the camera module, the height is lowered and the size of the IRCF is decreased. Thus, the costs can be reduced.

These and other objects, features and advantages of the present technology will become more apparent in light of the following detailed description of best mode embodiments thereof, as illustrated in the accompanying drawings.

DETAILED DESCRIPTION OF EMBODIMENTS

Hereinafter, an embodiment of the present technology will be described with reference to the drawings.

The embodiments of the present technology will be described in the following order.
1. First Embodiment (where IRCF is fixed on an upper face of a metal plate)
2. Second Embodiment (where IRCF is fixed on a lower face of a metal plate)
3. Third Embodiment (where half-etched step is disposed at end)
4. Fourth Embodiment (where an IRCF is adhered to upper face of bent step at end)
5. Fifth Embodiment (where an IRCF is adhered to lower face of bent step at end)
6. Sixth Embodiment (where adhesive reservoir is disposed at end)

<1. First Embodiment>
<Typical Camera Module>

Figure 1A:
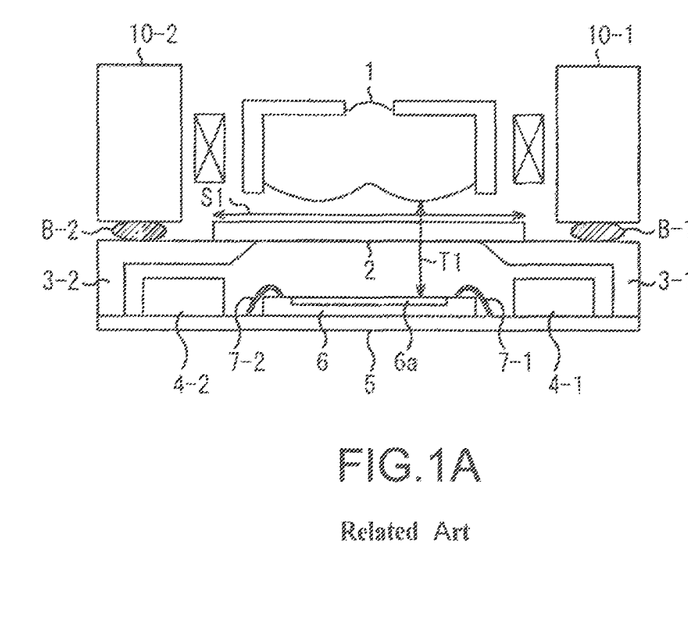
FIGS. 1A and 1B each is a side cross-sectional diagram showing a structure of an embodiment of a camera module to which a solid state imaging apparatus in the related art is applied.
Figure 1B:
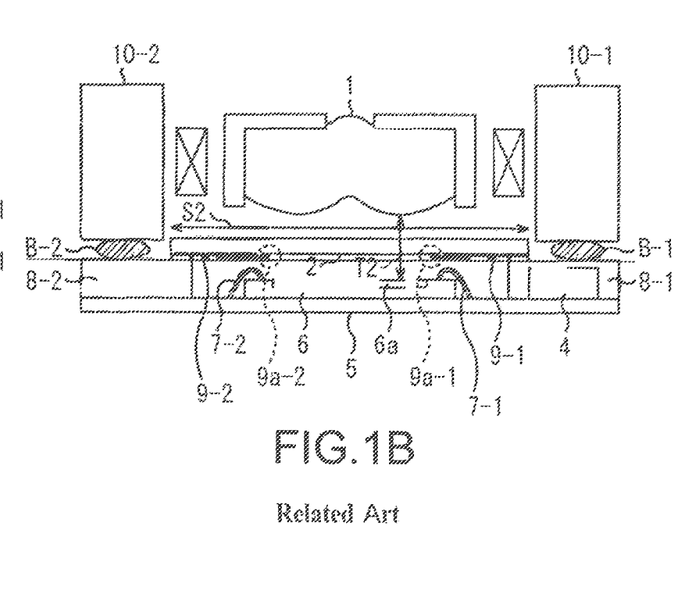

FIGS. 1A and 1B each is a side cross-sectional view of a lens and an image capturing element in a typical camera module in the related art.

In detail, as shown in FIG. 1A, the camera module is composed of a lens 1, an IRCF (infrared cut filter) 2, molded products 3-1 and 3-2, mounted components 4-1 and 4-2, a substrate 5, an image capturing element 6, wire bonds 7-1 and 7-2 and cylindrical lens units 10-1 and 10-2. Each of the lens units 10-1 and 10-2 houses the lens 1. The lens units 10-1 and 10-2 are adhered to the molded products 3-1 and 3-2 with adhesives B-1 and B-2 directly above the image capturing element 6 on the substrate 5 along a light axis of the lens 1.

As to the molded products 3-1 and 3-2, the mounted components 4-1 and 4-2, the wire bonds 7-1 and 7-2 and the lens units 10-1 and 10-2, the respective parts are the same in FIGS. 1A and 1B. Hereinafter, unless otherwise distinguished, they are simply referred to as a molded product 3, a mounted component 4, a wire bond 7, a lens unit 10 and others.

The lens 1 transmits an incident light, which is incident on the image capturing element 6 via the IRCF 2. The IRCF 2 is fixed by the molded product 3 disposed at the range not inhibiting the incident light from transmitting, and removes infrared components contained in the incident light.

The image capturing element 6 photoelectrically converts the incident light into a pixel signal, and outputs the pixel signal to the substrate 5 via wiring of the wire bond 7. More specifically, the image capturing element 6 has an effective pixel 6a at a center of a face on which the light is incident, photoelectrically converts the light incident on the effective pixel 6a into a pixel signal and outputs the pixel signal. The mounted component 4 is disposed on the substrate 5, and applies a variety of signal processing to the pixel signal supplied via the wire bond 7 from the image capturing element 6.

In the meantime, in the camera module shown in FIG. 1A, the molded product 3 has a relatively thicker thickness m. For example, the thickness m of the molded product 3 should be about 0.13 mm to 0.2 mm in order to mold the components stably and fix the IRCF 2 stably. For this reason, a distance from the lens 1 to the surface of the image capturing element 6, i.e., a distance T1 of a so-called lens back LB is not shorten. As a result, it is difficult to provide a thin camera module.

Then, according to the technology suggested by the above-described Japanese Patent Application Laid-open No. 2012-186434, as shown in FIG. 1B, the light shielding region 9 is printed on a face opposite to a light incident direction of the IRCF 2 externally to the effective pixel 6a, and fixed on the molded product disposed on the substrate 5, thereby inhibiting the ghost from generating.

However, in the technology in Japanese Patent Application Laid-open No. 2012-186434, the thickness of the printed light shielding region 9 forms an end face 9a, thereby reflecting the incident light. There is a little chance to generate the ghost. In order not to form the end face 9a on a tip of the light shielding region 9, the end face 9a is sharpen to have an angle exceeding a predetermined angle to the light incident direction, which may result in high costs.

Further, in order to inhibit the ghost from generating, the end of the light shielding region 9 should be positioned apart from the end of the effective pixel 6a of the image capturing element 6a. This may widen the opening. The incident light may be reflected on the wire bond 7 to generate the flare.

Alternatively, when the light shielding region 9 is printed on the IRCF2, the IRCF2 should have a size S2 greater than a size S1 (>S1) shown in FIG. 1A. A large IRCF2 is necessary, which may result in high costs.

<Camera Module to which the Present Technology is Applied>

Figure 2A:
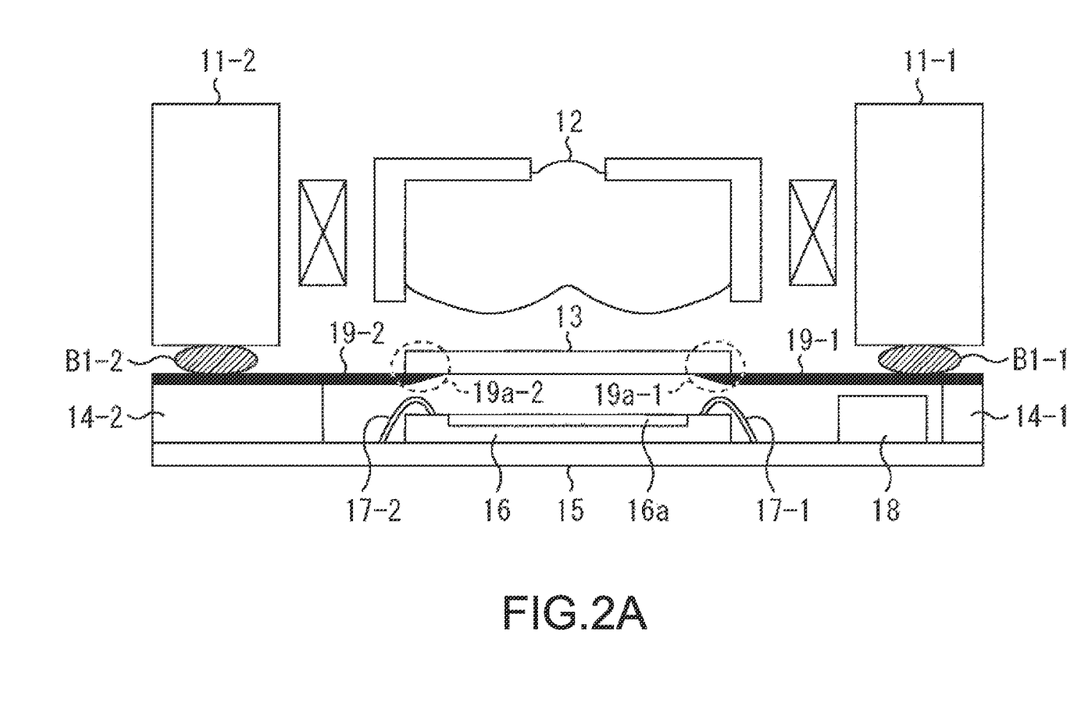
FIGS. 2A and 2B each is a diagram showing a structure according to a first embodiment of a camera module to which a solid state imaging apparatus of the present technology is applied.
Figure 2B:
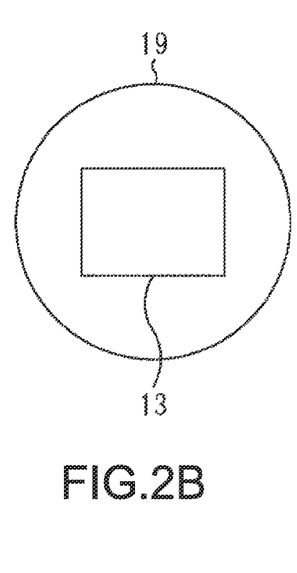

FIGS. 2A and 2B each is a diagram showing a structure according to a first embodiment of a camera module to which a solid state imaging apparatus of the present technology is applied. FIG. 2A is a side cross-sectional diagram, and FIG. 2B is a top diagram of a metal plate 19 as described later. The camera module shown in FIG. 2A includes lens units 11-1 and 11-2 including a lens 12, an IRCF (infrared cut filter) 13, molded products 14-1 and 14-2, a substrate 15, an image capturing element 16, a wiring (wire bond) 17, mounted components 18-1 and 18-2 and metal plates 19-1 and 19-2. In FIG. 2A, although there are the lens units 11-1 and 11-2, the molded products 14-1 and 14-2 and the metal plates 19-1 and 19-2, the respective parts are a unified structure. The mounted components 18-1 and 18-2 are individual but the same. Hereinafter, the lens units 11-1 and 11-2, the molded products 14-1 and 14-2, the mounted components 18-1 and 18-2 and the metal plates 19-1 and 19-2 refer simply to as a lens unit 11, a molded product 14, a mounted component 18 and a metal plate 19, unless otherwise distinguished. The same applies to other configurations.

The camera module shown in FIGS. 2A and 2B is added to a mobile phone, for example. A light being incident on the lens 12 of the lens unit 11 from above in FIG. 2A, is transmitted through the lens 12, and is formed as an image on the image capturing element 16 via the IRCF 13. The image capturing element 16 generates a pixel signal by photoelectric conversion based on the image formed, and generates and outputs image data based on the pixel signal.

The lens unit 11 is cylindrical. The lens 12 having a cylindrical or prismatic shape housed therein is moved in an up and down direction in FIG. 2A to adjust a focal position, a zoom etc. of the image formed. The IRCF 13 cuts infrared light among the incident light via the lens 12 and transmits it to the image capturing element 16. In the lens unit 11 shown in FIG. 2A, the lens 12 moves in the up and down direction in FIG. 2A, for example. Alternatively, the lens 12 may not move within the lens unit 11 and be a fixed type.

The image capturing element 16 is formed on the substrate 15 on which wiring etc. are printed, and is electrically connected to wiring printed on the substrate 15 by wirings 17-1 and 17-2 excluding the effective pixel 16a of the image capturing element 16. The effective pixel 16a among pixels formed on the image capturing element 16 is used to generate image data configured of captured images. On the image capturing element 16, an OPB (optical black) pixel and a connection terminal receiving signal input/output and electric power supply other than the effective pixel 16a.

The mounted components 18-1 and 18-2 are composed of electric circuit components such as a capacitor, a resistance and an IC (integrated circuit), are disposed at a predetermined position on the substrate 15, and is electrically connected thereto. Although the mounted components 18-1 and 18-2 etc. are present on the substrate 15, the mounted components 18-1 and 18-2 may not necessarily being present on the substrate.

Figure 5:
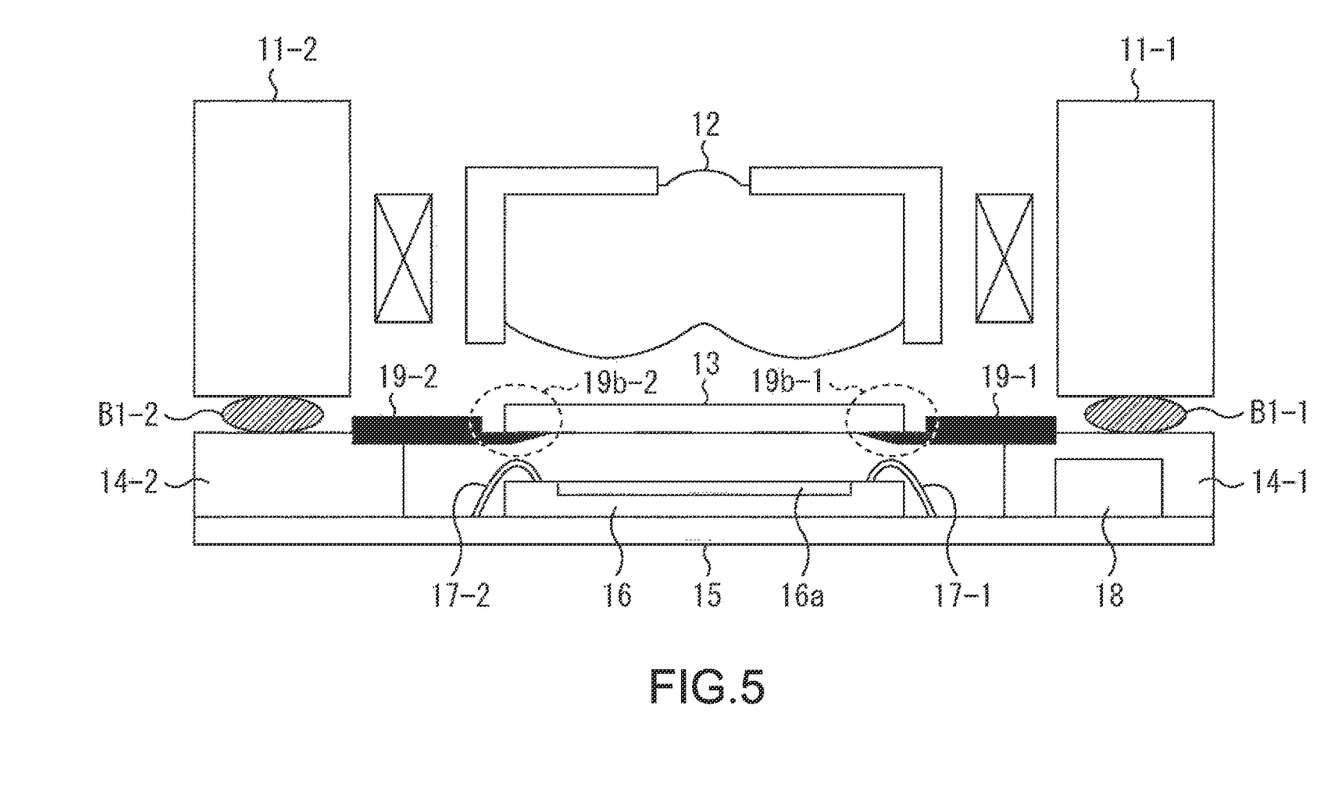
FIG. 5 is a diagram showing a structure according to a third embodiment of a camera module to which a solid state imaging apparatus in the related art is applied.

The molded products 14-1 and 14-2 are disposed at the height such that the IRCF 13 can be fixed on an upper face of the image capturing element 16 at an adequate height and the metal plate 19 is adhered and fixed thereon. Although the molded product 14 is configured independently in FIG. 2A, the molded product 14 may include the mounted components as shown in FIG. 5 as described later.

The metal plate 19 is an etched metal plate, and has a disk shape shown in FIG. 2B viewed from the light incident direction. Alternatively, the metal plate 19 may have a shape other than the disk, for example, may be square or other shapes. The metal shape 19 has an opening at a substantially center to fix the IRCF 13 directly above the effective pixel 16a of the image capturing element 16. The IRCF 13 is a filter for shielding infrared light which is a part of the incident light, and is adhered and fixed with an adhesive in conformity with the opening to block the whole of the opening. Ends 19a-1 and 19a-2 of the opening in the metal plate 19 are formed to have sharp shapes by etching, and are formed on faces having angles greater than predetermined angles to the light incident direction. In addition, the end 19a is antireflection treated and therefore has the structure that the incident light is hard to be reflected. Accordingly, the metal plate 19 functions as a region to fix the IRCF 13 on the image capturing element 16, functions as a light shielding region not to reflect the incident light on the wiring 17 of the wire bond, and also functions to decrease the flare generated by the reflection from the wiring 17 of the wire bond.

The metal plate 19 is etched by using a ferric chloride solution at a constant temperature (for example, 20° C.). The metal plate 19 is made of an iron-based, an aluminum-based and copper-based material, for example, SUS-based (SUS304-based or SUS630-based) material. The antireflection treatment is a blackening treatment such as a black coating treatment (black chromium plating) and a black painting. Note that a paint film by the black painting is thicker than a black coating film. Accordingly, the black coating treatment can provide a thinner configuration, which is hard to generate the end face for reflecting the incident light, thereby decreasing the ghost at high precision.

For this reason, the end face for reflecting a part of the incident light in a direction of the image capturing element 16 is not formed at the end face 19a of the metal plate 19, and the incident light is absorbed because of the antireflection treatment. As a result, it is possible to inhibit the ghost from generating, as the ghost is generated by reflecting the incident light on the end face of the end of the opening.

Figure 3:
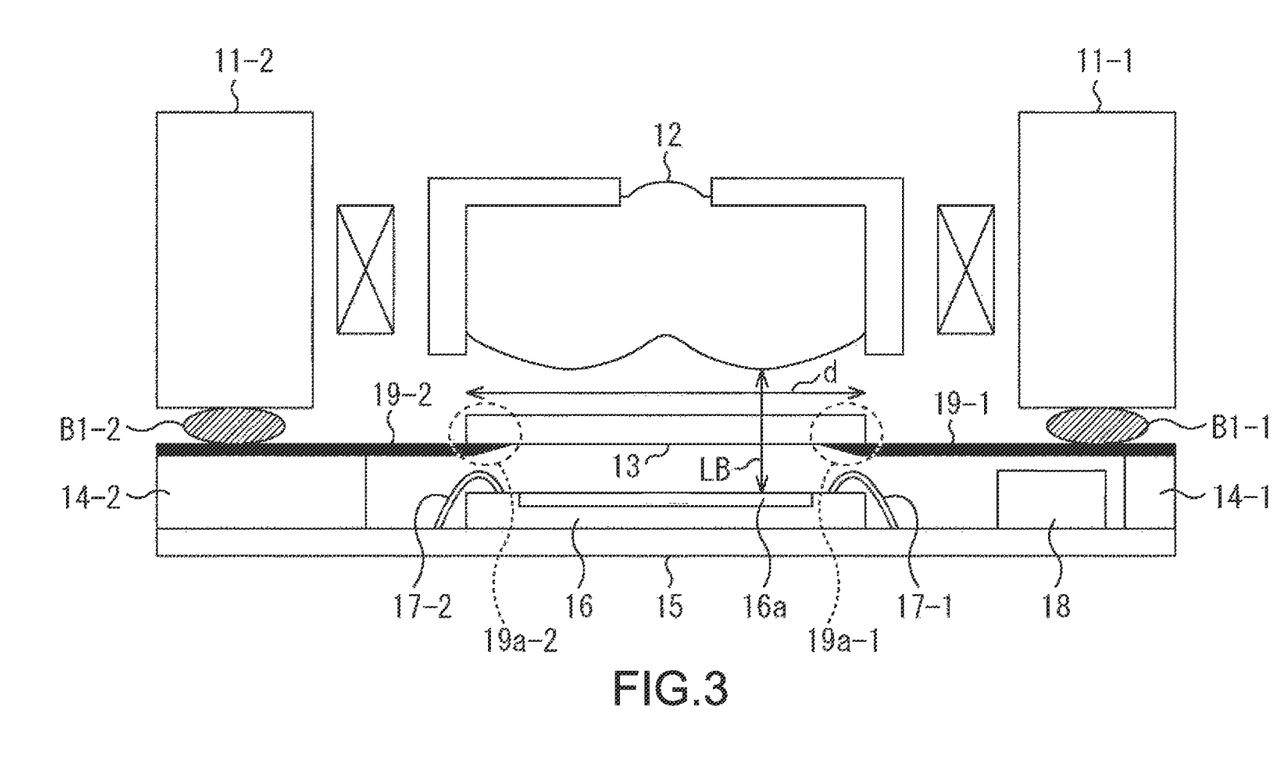
FIG. 3 is an enlarged diagram for illustrating ends of an opening of a metal plate shown in FIGS. 2A and 2B.

As shown in FIG. 3, the metal plate 19 has high stiffness and can be therefore thinner than the molded product to reduce the lens back LB, whereby the camera module can be thinner as a whole. Also, as the lens back LB is reduced, an optical design freedom is increased to improve optical properties.

Furthermore, as shown in FIG. 3, the end 19a is etched to have a shaper shape, the opening of the metal plate 19 can be small close to a size of the effective pixel 16a of the image capturing element 16, and a size d of the IRCF 13 can be decreased, thereby reducing the costs of the IRCF 13. In the end 19a of the opening in the metal plate 19, no end face for reflecting the incident light is formed. The end 19a functions as a light shielding wall to an edge of the end of the effective pixel 16a. FIG. 3 is an enlarged diagram of the side cross-sectional view of FIG. 2A around the end 19a of the metal plate 19, and show the lens back LB and the size d of the IRCF 13.

The lens unit 11 is adhered to an upper face of the metal plate 19 adhered to the molded product 14 by each of adhesives B1-1 and B1-2.

The camera module shown in FIG. 2A can be considered to be composed of a solid state image capturing apparatus package surrounded by the IRCF 13, the molded product 14 and the substrate 15; and the lens unit 11. In other words, the camera module can have a variety of optical properties corresponding to kinds of the lens 12 of the lens unit 11 by a combination of the solid state image capturing apparatus package and the lens unit.

<2. Second Embodiment>

In the embodiment above, the IRCF 13 is adhered above the opening of the metal plate 19. Alternatively, the IRCF 13 may be adhered under the opening of the metal plate 19.

Figure 4:
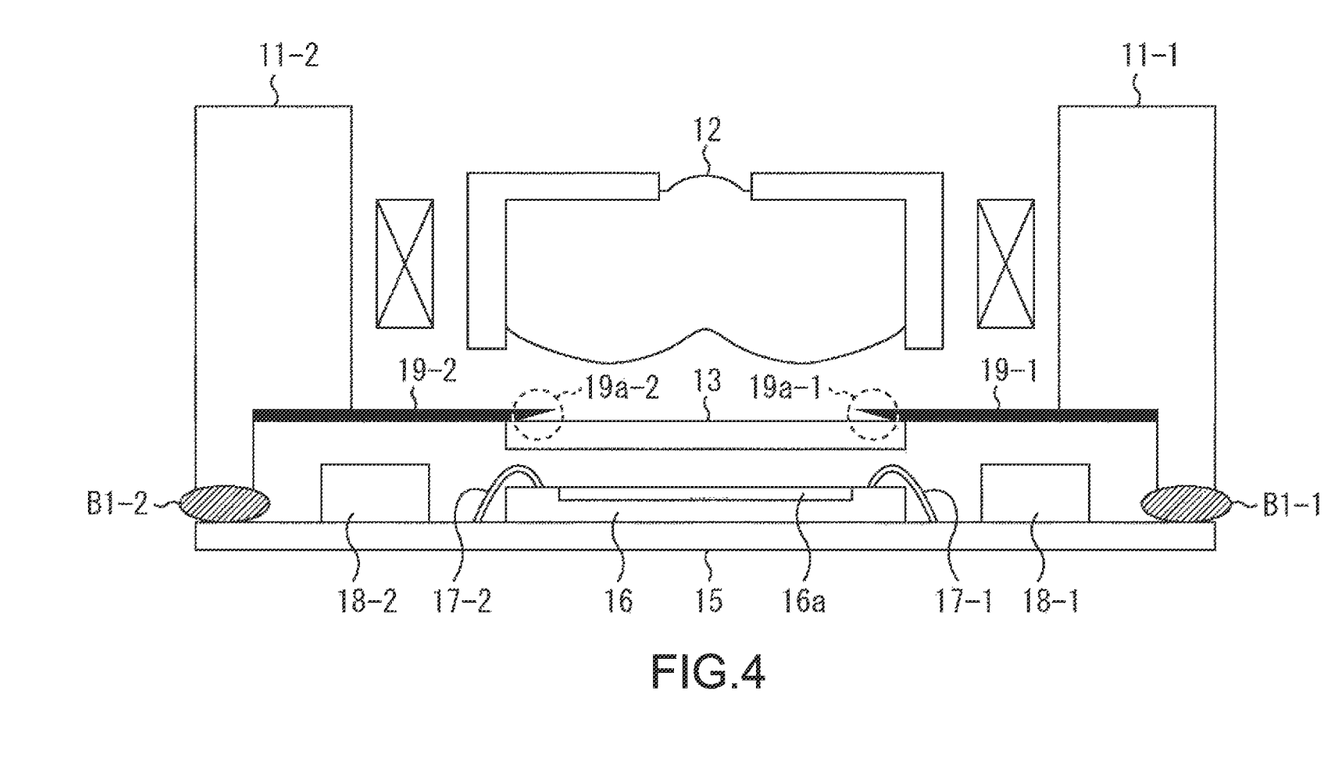
FIG. 4 is a diagram showing a structure according to a second embodiment of a camera module to which a solid state imaging apparatus in the related art is applied.

FIG. 4 is a diagram showing a camera module where the IRCF 13 is adhered under the opening of the metal plate 19. In FIG. 4, the components already described in FIGS. 2A and 2B are denoted by the same name and the same reference numerals, and thus detailed description thereof will be hereinafter omitted.

In other words, as shown in FIG. 4, the lens unit 11 is adhered to the substrate 15 with each of the adhesives B1-1 and B1-2, the metal plate 19 is adhered to a bottom face of the lens unit 11, and the IRCF 13 is adhered under the opening of the metal plate 19.

The configuration shown in FIG. 4 can also provide advantages similar to the camera module shown in FIG. 2.

<3. Third Embodiment>

In the embodiment above, the opening in the metal plate 19 is formed to be thin and have sharp shapes by etching. Alternatively, by half-etching the end of the opening in the metal plate 19, the end may be formed to be thin and have sharp shape, and a step may be provided to adhere the IRCF 13.

FIG. 5 shows a camera module where the ends 19b-1 and 19b-2 having a half-etched step on the opening of the metal plate 19. In FIG. 5, the components already described in FIGS. 2A and 2B are denoted by the same name and the same reference numerals, and thus detailed description thereof will be hereinafter omitted.

In other words, as shown in FIG. 5, in the end 19b of the metal plate 19, a half-etched step is provided to adhere the IRCF 13 upward, and the IRCF 13 is fixed to an upper face of the step provided in the end 19b. According to such a configuration, even if the metal plate 19 is somewhat thick, the end 19b to which the IRCF 13 is fixed is sharp and thin by half-etching and the step for fixing the IRCF 13 is provided, thereby decreasing the lens back. The configuration shown in FIG. 5 can also provide advantages similar to the camera module shown in FIG. 2.

In FIG. 5, the molded product 14-1 includes the mounted component 18. Although the molded product 14 may include the mounted component, a substrate with in-built components, a packaged mold, a frame component, a lens unit and an actuator may be used instead of the molded product 14.

Although FIG. 5 shows the end 19b having the step for fixing the IRCF 13 on the upper face of the metal plate 19 by half-etching, the end 19b having the step for fixing the IRCF 13 may be provided on the lower face of the metal plate 19 such that the IRCF 13 may be fixed on the lower face of the metal plate 19 with the adhesive.

<4. Fourth Embodiment>

In the embodiment above, the half-etched step is provided to the opening in the metal plate 19. Alternatively, the step for adhering the IRCF 13 may be provided by press bending after the end of the opening in the metal plate 19 is etched.

Figure 6:
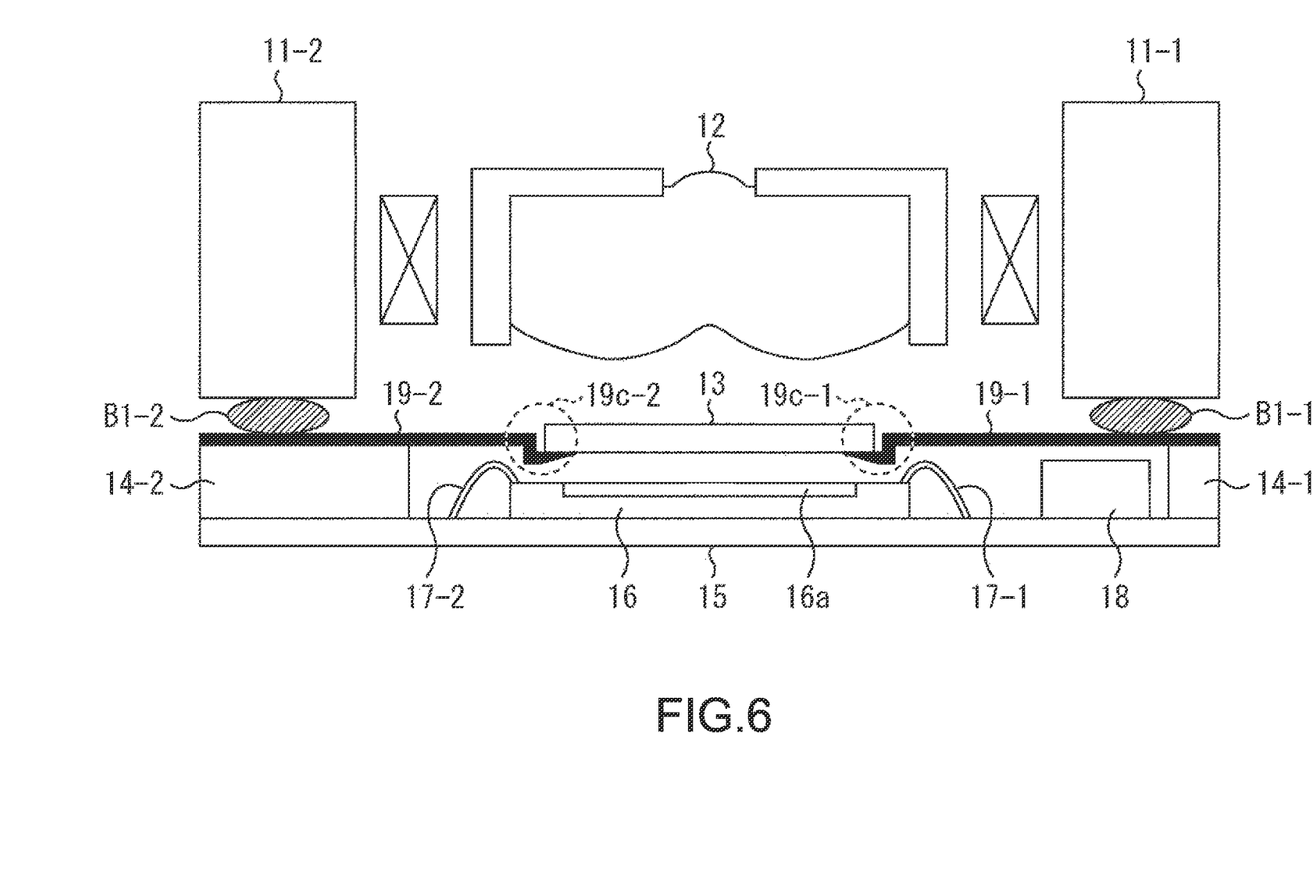
FIG. 6 is a diagram showing a structure according to a fourth embodiment of a camera module to which a solid state imaging apparatus in the related art is applied.

FIG. 6 is a diagram showing a camera module having the stepped ends 19c-1 and 19c-2 by press bending on the opening of the metal plate 19. In FIG. 6, the components already described in FIGS. 2A and 2B are denoted by the same name and the same reference numerals, and thus detailed description thereof will be hereinafter omitted.

In other words, as shown in FIG. 6, the end 19c of the metal plate 19 is press bent to have the step, and the IRCF 13 is fixed to a face on which the step of the end 19c is provided. As the end 19c to which the IRCF 13 is fixed is sharp and thin by etching, the ghost is inhibited, the lens back can be decreased, and the IRCF 13 can be smaller. As a result, advantages can also be provided similar to the camera module shown in FIG. 2.

<5. Fifth Embodiment>

In the embodiment above, after the opening is etched in the metal plate 19, the end having the step by press bending is provided to fix the IRCF 13 on the metal plate 19. Alternatively, after the opening is etched in the metal plate 19, the end 19c having the step by press bending is provided to adhere the IRCF 13 on the lower face of the step.

Figure 7:
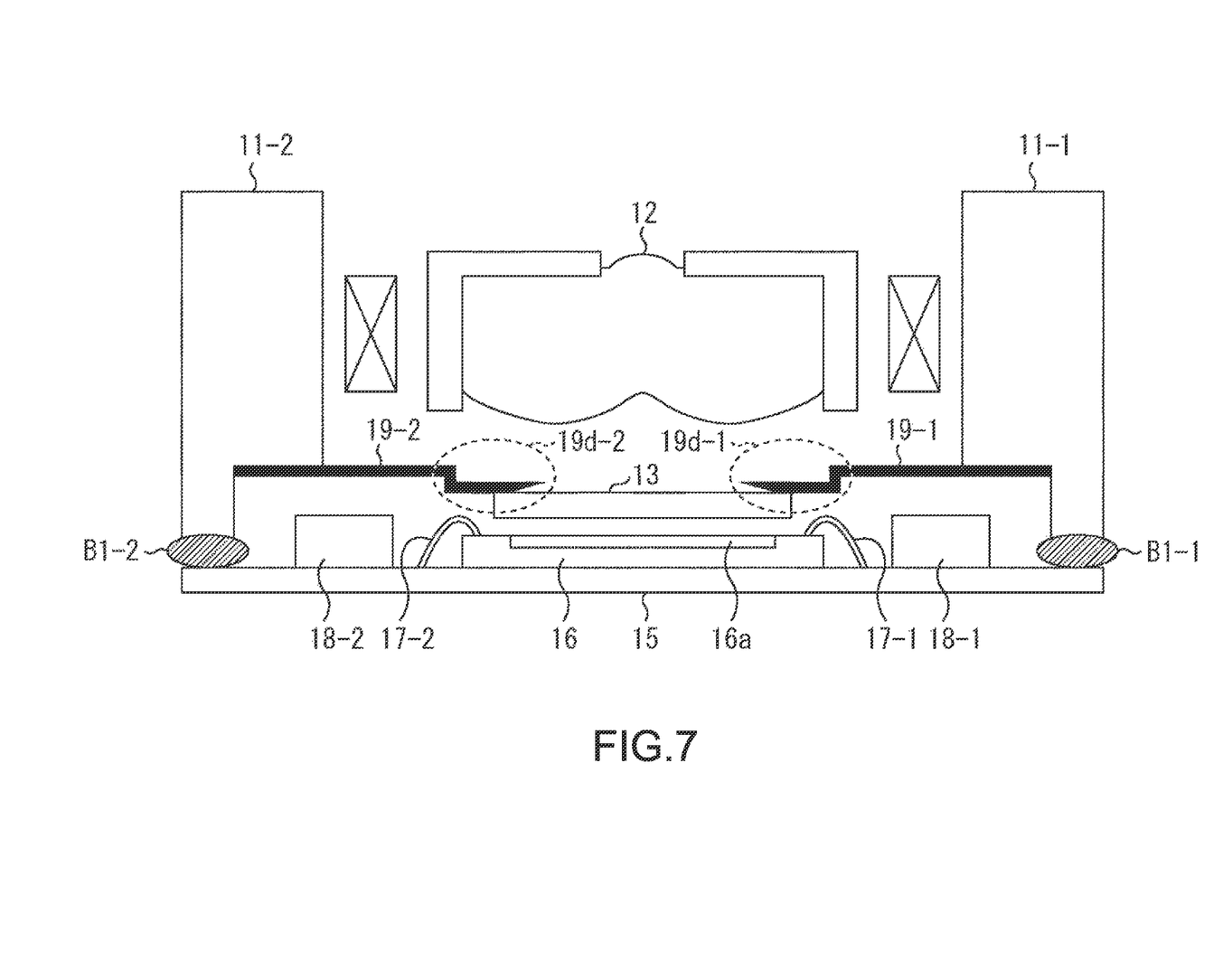
FIG. 7 is a diagram showing a structure according to a fifth embodiment of a camera module to which a solid state imaging apparatus in the related art is applied.

FIG. 7 shows a camera module having stepped ends 19d-1 and 19d-2 by press bending on the opening of the metal plate 19, and the IRCF 13 is adhered to a lower face of the step. In FIG. 7, the components already described in FIGS. 2A and 2B are denoted by the same name and the same reference numerals, and thus detailed description thereof will be hereinafter omitted.

In other words, as shown in FIG. 7, the end 19d of the metal plate 19 is press bent to have the step, and the IRCF 13 is fixed to the lower face of the step of the end 19d. As the end 19d to which the IRCF 13 is fixed is sharp and thin by etching, the ghost is inhibited, the lens back can be decreased, and the IRCF 13 can be smaller. As a result, advantages can also be provided similar to the camera module shown in FIG. 2.

<Concaves in Metal Plate>

Figure 8:
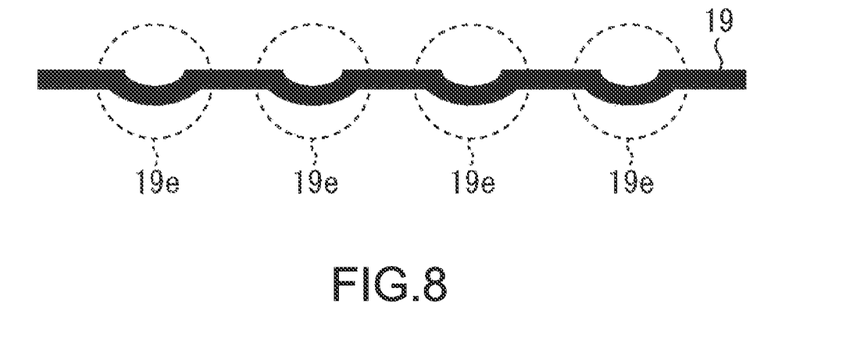
FIG. 8 is a side cross-sectional diagram of a metal plate bent.

The metal plate 19 may be bent a part or a whole thereof to provide concaves 19e, thereby improve stiffness, as shown in a side cross-sectional diagram of FIG. 8.

<6. Sixth Embodiment>

Figure 9A:
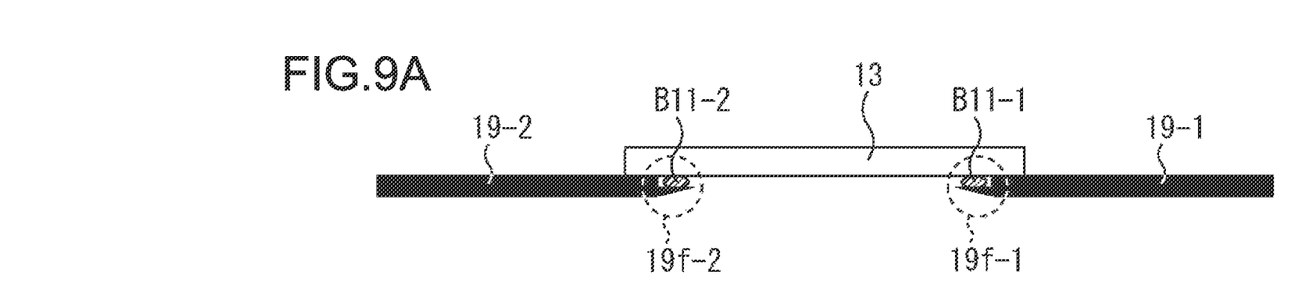
FIGS. 9A, 9B and 9C each is a side cross-sectional diagram of a metal plate having an end including an adhesive reservoir of an opening.
Figure 9B:
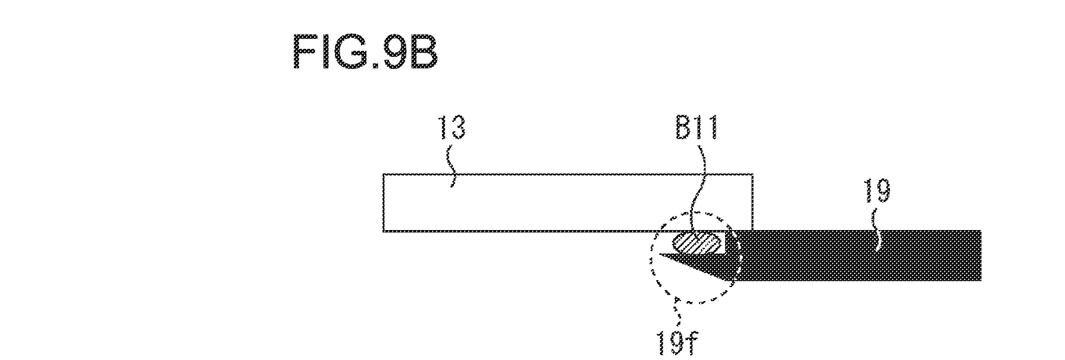

Furthermore, the opening of the metal plate 19 may include an end 19f having an adhesive reservoir step for reserving each of adhesives B11-1 and B11-2 used for adhering the IRCF 13, as shown in FIG. 9A. In this manner, the adhesive B11 for adhering the IRCF 13 on an adhesive face is pressed to be squeezed on the IRCF 13 when the IRCF 13 is adhered to the metal plate 19, whereby the end face for reflecting the incident light is prevented from generating. As a result, the ghost can be inhibited from generating.

Figure 9C:
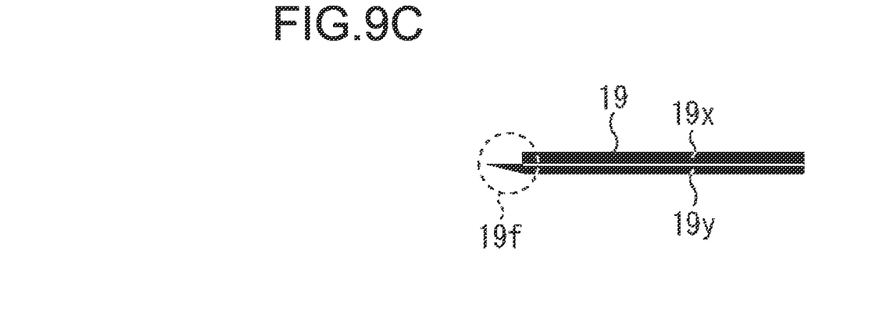

The end 19f having the adhesive reservoir step for reserving the adhesive B11-1 may be formed by half-etching. In addition, the end 19f may be formed by diffusion bonding of two metal plates 19x and 19y as shown in FIG. 9C.

<Thickness of Metal Plate>

The metal plate should have a predetermined thickness that does not interfere with other configurations caused by a deflection generated upon falling.

Figure 10:
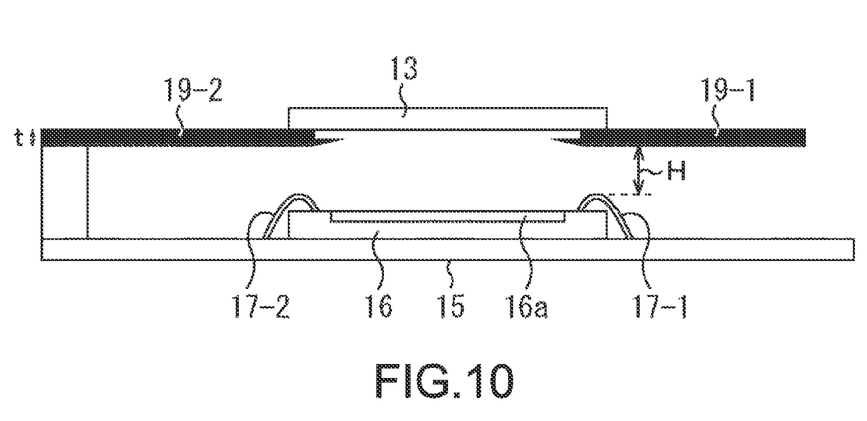
FIG. 10 is a diagram for illustrating a relationship between a thickness and a warp of a metal plate.

Tables 1 and 2 each shows a simulated result showing a relationship between a plate thickness (0.06 to 0.01 mm) and a deflection (opening deflection upon falling) when the material of the metal plate 19 is SUS304 based and C2801 based material. Here, the deflection is measured in positive and negative directions of the metal plate 19 at a height H directly above the wire bond WB where interference is most easily generated, as shown in FIG. 10. In the simulation, an impact value upon falling is added.

TABLE 1

| Plate thickness | | Opening deflection upon falling | Total |
|---|---|---|---|
| 0.06 | + | 0.009 | 0.069 |
| 0.05 | + | 0.012 | 0.062 |
| 0.04 | + | 0.019 | 0.059 |
| 0.03 | + | 0.025 | 0.055 |
| 0.02 | + | 0.051 | 0.071 |
| 0.01 | + | 0.180 | 0.200 |

TABLE 2

| Plate thickness | | Opening deflection upon falling | Total |
|---|---|---|---|
| 0.06 | + | 0.013 | 0.073 |
| 0.05 | + | 0.021 | 0.071 |

TABLE 2-continued

| Plate thickness | | Opening deflection upon falling | Total |
|---|---|---|---|
| 0.04 | + | 0.026 | 0.066 |
| 0.035 | + | 0.030 | 0.065 |
| 0.03 | + | 0.036 | 0.066 |
| 0.02 | + | 0.069 | 0.089 |
| 0.01 | + | 0.290 | 0.300 |

In other words, when the material of the metal plate 19 is SUS304 based material and the plate thickness is 0.06 mm, the deflection is 0.009 mm, which totals 0.069 mm taking interference generation into consideration; when the plate thickness is 0.05 mm, the deflection is 0.012 mm, which totals 0.062 mm taking interference generation into consideration. Similarly, when the plate thickness is 0.04 mm, the deflection is 0.019 mm, which totals 0.059 mm; when the plate thickness is 0.03 mm, the deflection is 0.025 mm, which totals 0.055 mm; when the plate thickness is 0.02 mm, the deflection is 0.051 mm, which totals 0.071 mm; when the plate thickness is 0.01 mm, the deflection is 0.180 mm, which totals 0.2 mm. In view of the above, when the material of the metal plate 19 is SUS304 based material, a most suitable thickness is 0.03 mm where the total of the deflection and the thickness is smallest.

When the material of the metal plate 19 is copper based C2801 material and the plate thickness is 0.06 mm, the deflection is 0.013 mm, which totals 0.073 mm taking interference generation into consideration; when the plate thickness is 0.05 mm, the deflection is 0.021 mm, which totals 0.071 mm taking interference generation into consideration. Similarly, when the plate thickness is 0.04 mm, the deflection is 0.026 mm, which totals 0.066 mm; when the plate thickness is 0.035 mm, the deflection is 0.030 mm, which totals 0.055 mm; when the plate thickness is 0.03 mm, the deflection is 0.036 mm, which totals 0.066 mm; when the plate thickness is 0.02 mm, the deflection is 0.069 mm, which totals 0.089 mm; when the plate thickness is 0.01 mm, the deflection is 0.290 mm, which totals 0.3 mm. In view of the above, when the material of the metal plate 19 is C2801P based material, a most suitable thickness is 0.035 mm where the total of the deflection and the thickness is smallest.

As shown in FIG. 10, from the standpoint of the relationship between the plate thickness and the deflection of the metal plate 19, an appropriate thickness of the metal plate 19 is about 0.02 to 0.05 mm. The relationship between the plate thickness and the deflection shown in FIG. 10 is based on the condition that the IRCF 13 is directly fixed to the end of the opening.

<Holes for Alignment>

Figures 11A, 11B:
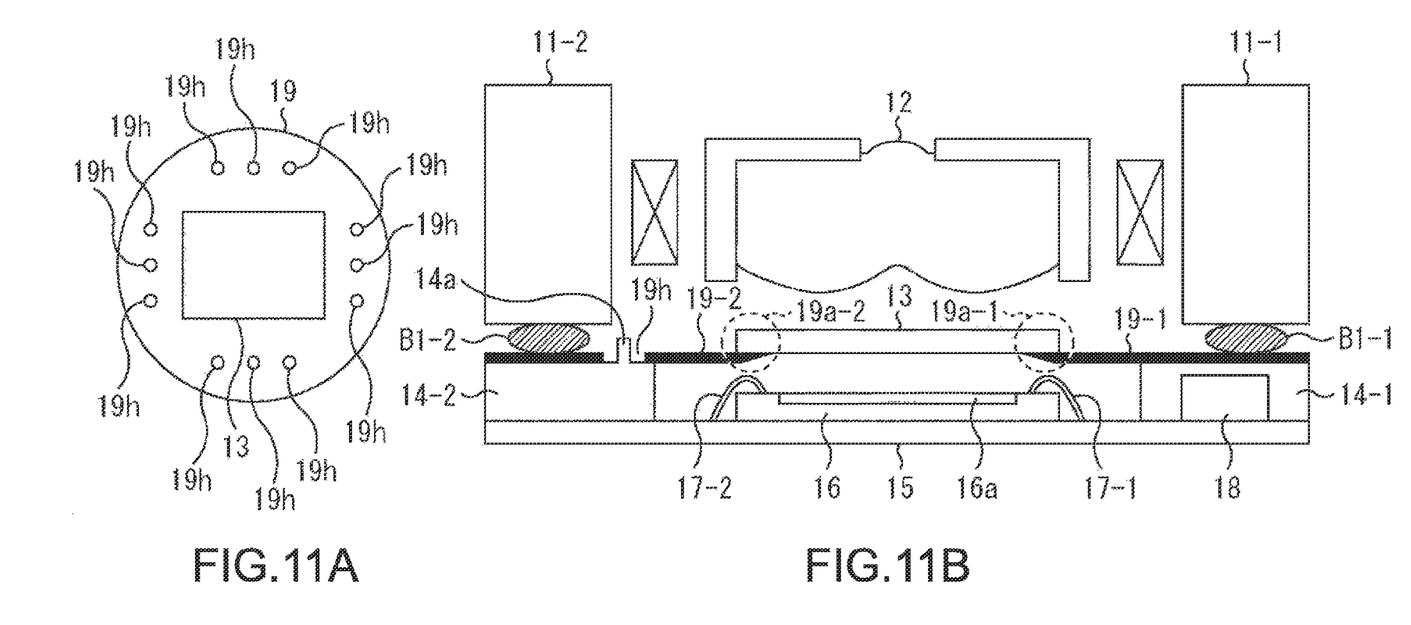
FIGS. 11A and 11B each is a diagram for illustrating a camera module having a metal plate including a hole for inserting a positional pin.

As shown in FIGS. 11A and 11B, a positioning pin 14a is disposed on the molded product 14 and holes 19h corresponding to the positioning pin 14a are disposed on the metal plate 19, which may be used for alignment when the metal plate 19 is mounted on the molded product 14.

In other words, by such a configuration, a convex positioning pin 14a is positioned to insert to the holes 19h in a step of mounting the metal plate 19, thereby improving work efficiency and determining the alignment accuracy. Although the convex positioning pin 14a is provided corresponding to the holes 19h in FIG. 11A, other convex shapes for locking the holes 19h or a granulated surface may be provided even though they are not inserted into the holes 19 but they can position the metal plate 19 at a fixed position. Instead of the holes 19h, concaves may be provided. Furthermore, although twelve holes 19h are shown in total in FIG. 11A, the holes 19h may be any number. As long as the positioning can be made, the holes 19h may be provided at a position excluding the position shown in FIG. 11.

<Vent>

Figure 12A:
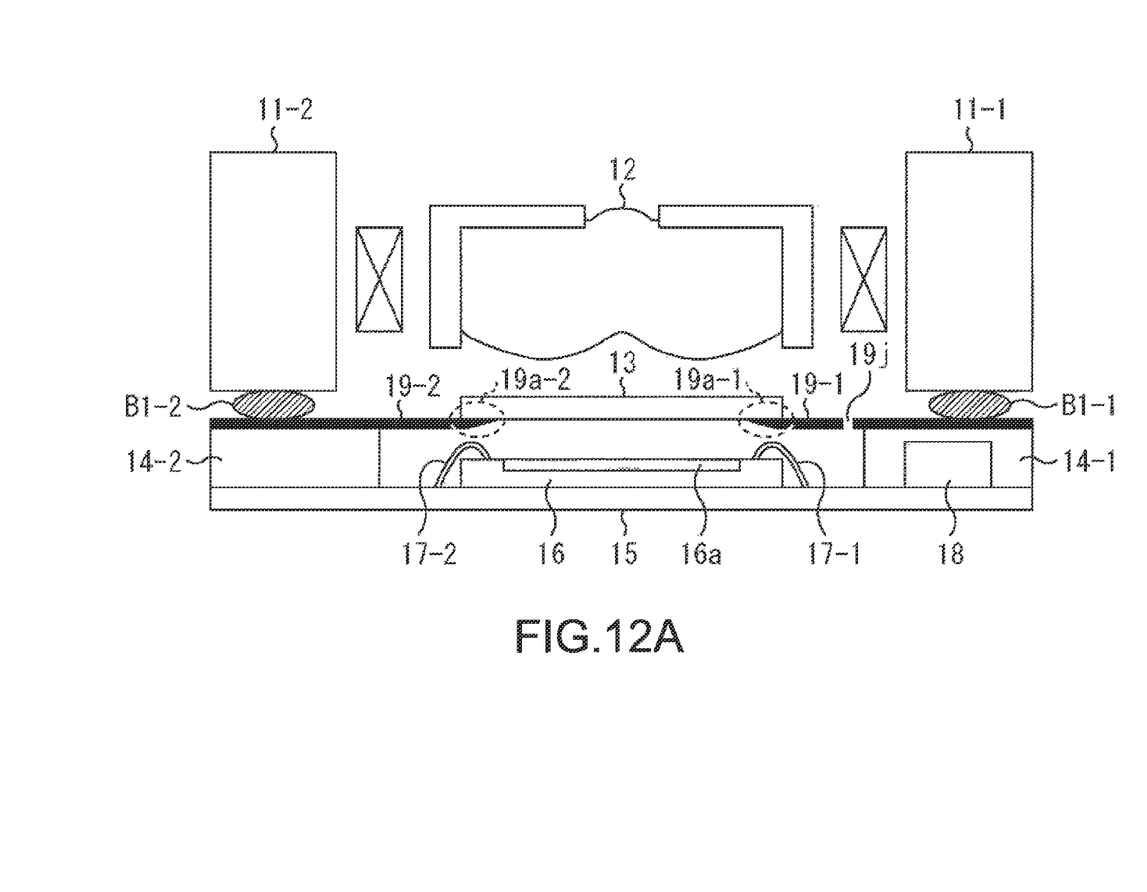
FIGS. 12A and 12B each is a diagram for illustrating a camera module having a metal plate including a vent.
Figure 12B:
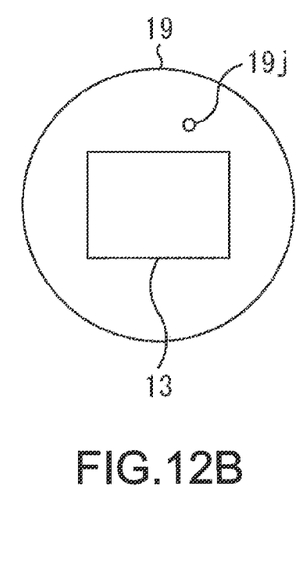

In the meantime, as a space is provided between the metal plate 19 and the image capturing element 16, the IRCF 13 and the image capturing element 16 may be fogged by a rapid change in temperature or humidity. Then, as shown in FIGS. 12A and 12B, there may be provided a vent 19j for ventilating air within the space between the metal plate 19 and the image capturing element 16 to the external.

By providing the vent 19j, the air within the space between the metal plate 19 and the image capturing element 16 can be ventilated to the external, thereby inhibiting the IRCF 13 and the image capturing element 16 from fogging. A diameter of the vent 19j is desirably very small so that the image capturing element 16 is not contaminated.

<Light Shielding Wall>

In the embodiment above, the end of the opening in the metal plate 19 is etched or half-etched. Alternatively, a peripheral end may be pressed to bend in a perpendicular direction, thereby forming a light shielding wall, as shown in FIG. 13.

Figure 13:
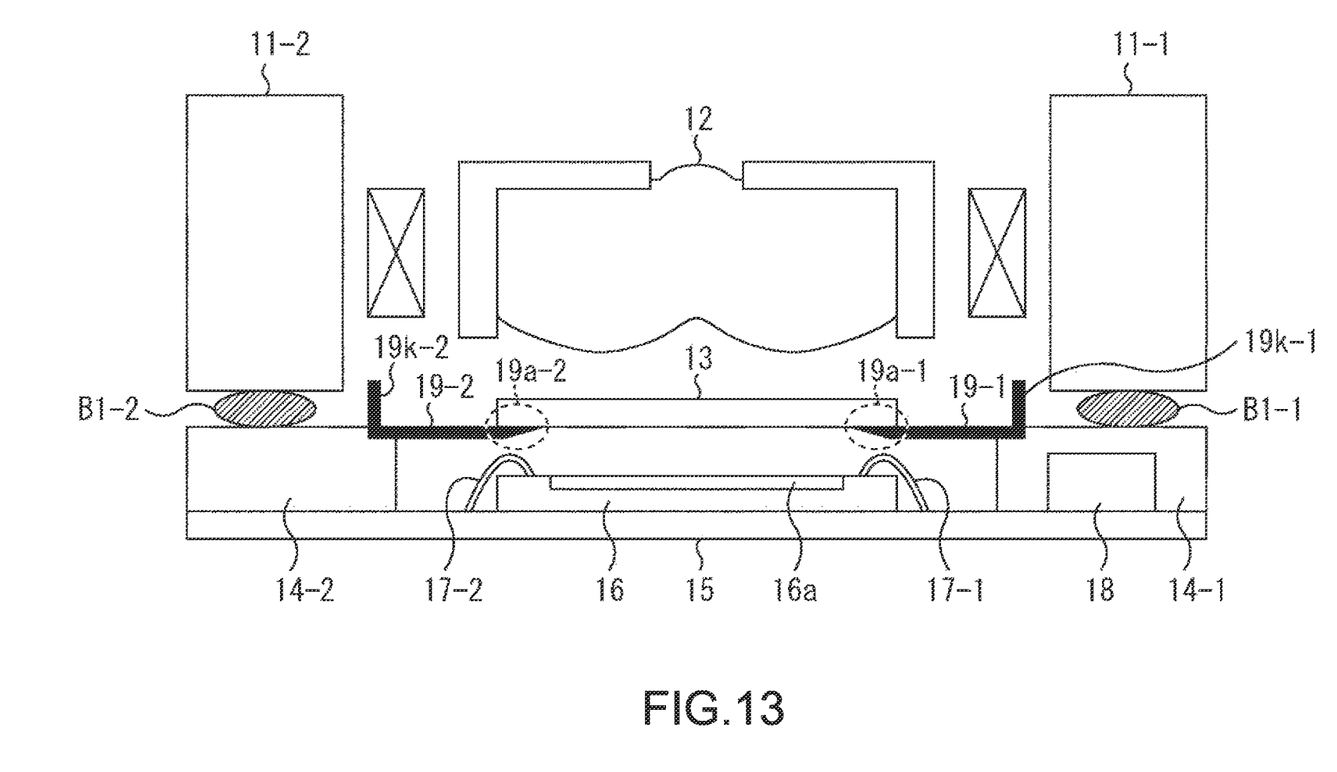
FIG. 13 is a diagram for illustrating a camera module having a metal plate including a light shielding region.

In other words, as shown in FIG. 13, pressing the peripheral end to bend in the perpendicular direction and to form a light shielding wall 19k allows the light incident on the image capturing element 16 from a space within the lens unit 11 to be shielded and inhibits a noise from generating.

The present technology is not limited to the above-described embodiments, and variations and modifications may be made without departing from the scope of the present technology.

The present technology may have the following configurations.

(1) A solid state image capturing apparatus, including:
an image capturing element for photoelectric converting an incident light;
a light shielding filter for shielding a part of the incident light; and
a metal plate partly having an opening for fixing the light shielding filter at a position for blocking the opening,
an end of the opening of the metal plate being etched and antireflection treated.

(2) The solid state image capturing apparatus according to (1) above, in which
the metal plate has a half-etched step on which the light shielding filter is mounted at the end of the opening.

(3) The solid state image capturing apparatus according to (1) above, in which
the metal plate is press bent at the end of the opening.

(4) The solid state image capturing apparatus according to (1) above, in which
the metal plate is adhered to a structure including any of a substrate with in-built components, a packaged mold, a frame component, a lens unit and an actuator.

(5) The solid state image capturing apparatus according to (1) above, in which the metal plate may be bent partly.

(6) The solid state image capturing apparatus according to (1) above, in which
the metal plate has an adhesive reservoir step for applying an adhesive to fix the light shielding filter.

(7) The solid state image capturing apparatus according to (6) above, in which
the step is formed by half etching or diffusion bonding.

(8) The solid state image capturing apparatus according to (1) above, in which
the metal plate is fixed by adhering the light shielding filter to the end of the opening.

(9) The solid state image capturing apparatus according to any of (1) to (8) above, in which
the light shielding filter is an IRCF (infrared cut filter).

(10) The solid state image capturing apparatus according to any of (1) to (9) above, in which
the antireflection is by blackening.

(11) The solid state image capturing apparatus according to any of (1) to (10) above, in which
the metal plate is made of an iron-based, an aluminum-based and copper-based material.

(12) The solid state image capturing apparatus according to any of (1) to (11) above, in which
the metal plate has a plate thickness of about 0.02 mm to 0.05 mm.

(13) The solid state image capturing apparatus according to any of (1) to (13) above, in which
the metal plate has a hole, a concave or a granulated surface corresponding to a convex for positioning disposed on the structure to be adhered.

(14) The solid state image capturing apparatus according to any of (1) to (13) above, in which
the metal plate has a vent.

(15) The solid state image capturing apparatus according to any of (1) to (14) above, in which
the metal plate has a light shielding wall at a peripheral.

(16) A camera module, including:
an image capturing element for photoelectric converting an incident light;
a light shielding filter for shielding a part of the incident light; and
a metal plate partly having an opening for fixing the light shielding filter at a position for blocking the opening,
an end of the opening of the metal plate being etched and antireflection treated.

(17) An electronic device, including:
an image capturing element for photoelectric converting an incident light;
a light shielding filter for shielding a part of the incident light; and
a metal plate partly having an opening for fixing the light shielding filter at a position for blocking the opening,
an end of the opening of the metal plate being etched and antireflection treated.

It should be understood by those skilled in the art that various modifications, combinations, sub-combinations and alterations may occur depending on design requirements and other factors insofar as they are within the scope of the appended claims or the equivalents thereof.

What is claimed is:

1. A solid state image capturing apparatus, comprising:
   an image capturing element for photoelectric converting incident light;
   a light shielding filter for shielding part of the incident light; and
   a metal plate having an opening for fixing the light shielding filter at a position for blocking the opening,
   an end of the opening of the metal plate being etched and antireflection treated, wherein the metal plate has a light shielding wall at a peripheral portion that is furthest away from the image capturing element, and wherein the light shielding wall is perpendicular to a remaining portion of the metal plate and extends from a top surface of the remaining portion in a direction away from the image capturing element.

2. The solid state image capturing apparatus according to claim 1, wherein the metal plate is adhered to a structure including any one of a substrate with in-built components, a packaged mold, a frame component, a lens unit and an actuator.

3. The solid state image capturing apparatus according to claim 1, wherein the metal plate is fixed by adhering the light shielding filter to the end of the opening.

4. The solid state image capturing apparatus according to claim 1, wherein the light shielding filter is an IRCF (infrared cut filter).

5. The solid state image capturing apparatus according to claim 1, wherein the antireflection is by blackening.

6. The solid state image capturing apparatus according to claim 1, wherein the metal plate is made of an iron-based, an aluminum-based and copper-based material.

7. The solid state image capturing apparatus according to claim 1, wherein the metal plate has a plate thickness of 0.02 mm to 0.05 mm.

8. The solid state image capturing apparatus according to claim 1, wherein the metal plate has a hole, a concave or a granulated surface corresponding to a convex for positioning disposed on a structure to be adhered.

9. The solid state image capturing apparatus according to claim 1, wherein the metal plate has a vent for ventilating air between the metal plate and the image capturing element.

10. A camera module, comprising:
    an image capturing element for photoelectric converting incident light;
    a light shielding filter for shielding part of the incident light; and
    a metal plate having an opening for fixing the light shielding filter at a position for blocking the opening,
    an end of the opening of the metal plate being etched and antireflection treated, wherein the metal plate has a light shielding wall at a peripheral portion that is furthest away from the image capturing element, and wherein the light shielding wall is perpendicular to a remaining portion of the metal s late and extends from a to surface of the remaining portion in a direction away from the image capturing element.

11. An electronic device, comprising:
    an image capturing element for photoelectric converting incident light;
    a light shielding filter for shielding part of the incident light; and
    a metal plate having an opening for fixing the light shielding filter at a position for blocking the opening,
    an end of the opening of the metal plate being etched and antireflection treated, wherein the metal plate has a light shielding wall at a peripheral portion that is furthest away from the image capturing element, and wherein the light shielding wall is perpendicular to a remaining portion of the metal plate and extends from a top surface of the remaining portion in a direction away from the image capturing element.

12. The solid state image capturing apparatus according to claim 1, wherein the metal plate is disk shaped.

13. The solid state image capturing apparatus according to claim 12, wherein the opening is rectangular shaped.

* * * * *